United States Patent
Liu et al.

(10) Patent No.: US 12,247,352 B2
(45) Date of Patent: Mar. 11, 2025

(54) STEEL CORD AND MANUFACTURING PROCESS THEREFOR

(71) Applicant: Jiangsu Xingda Steel Tyre Cord Co., Ltd., Jiangsu (CN)

(72) Inventors: Xiang Liu, Jiangsu (CN); Aiping Wang, Jiangsu (CN); Nianpeng Zhao, Jiangsu (CN); Weiming Ma, Jiangsu (CN); Xianghui Liu, Jiangsu (CN); Chundong Pan, Jiangsu (CN); Cunjun Zhao, Jiangsu (CN)

(73) Assignee: Jiangsu Xingda Steel Tyre Cord Co., Ltd. (CN)

( * ) Notice: Subject to any disclaimer, the term of this patent is extended or adjusted under 35 U.S.C. 154(b) by 86 days.

(21) Appl. No.: 17/760,665

(22) PCT Filed: Apr. 30, 2021

(86) PCT No.: PCT/CN2021/091412
§ 371 (c)(1),
(2) Date: Mar. 15, 2022

(87) PCT Pub. No.: WO2022/142034
PCT Pub. Date: Jul. 7, 2022

(65) Prior Publication Data
US 2024/0044075 A1    Feb. 8, 2024

(30) Foreign Application Priority Data
Dec. 28, 2020   (CN) .................. 202011579287.X

(51) Int. Cl.
*D07B 9/00* (2006.01)
*B60C 9/00* (2006.01)
*D07B 1/06* (2006.01)

(52) U.S. Cl.
CPC ............ *D07B 1/062* (2013.01); *B60C 9/0007* (2013.01); *D07B 2201/102* (2013.01);
(Continued)

(58) Field of Classification Search
CPC .............. D07B 1/062; D07B 2201/102; D07B 2201/104; D07B 2201/2006; D07B 2501/2046
See application file for complete search history.

(56) References Cited

U.S. PATENT DOCUMENTS

| | | | | |
|---|---|---|---|---|
| 5,911,675 | A | * | 6/1999 | Obana ..................... D07B 1/064 57/902 |
| 2021/0395947 | A1 | * | 12/2021 | Shizuku ................ D07B 1/0693 |
| 2023/0135243 | A1 | * | 5/2023 | Lionetti ................ D07B 1/0613 152/451 |

FOREIGN PATENT DOCUMENTS

| CN | 102203341 A | * 9/2011 | ........... D07B 1/0633 |
|---|---|---|---|
| CN | 111926597 A | * 11/2020 | ............... D07B 1/06 |

(Continued)

*Primary Examiner* — Tajash D Patel

(57) ABSTRACT

A steel cord and a manufacturing process are disclosed. The steel cord includes a steel core wire located in the center and having a diameter of d; and M sheath-layer steel wires arranged around the steel core wire in the center, tangent to the steel core wire, and having a diameter of d1, at least two gaps L existing between the M sheath-layer steel wires, where M is 4; d, d1, and L satisfy the following relationship: 0.420<(d/d1)<0.800, d1 is between 0.20 mm and 0.44 mm, and L≥0.0008 mm. The steel cord of the present invention may allow rubber to be fully penetrated into the gaps, thereby reducing air content in the steel cord, avoiding point contact friction between the layers of steel wires due to insufficient rubber penetration, and further solving the problem of failure of the bearing capacity of the steel cord due to abrasion.

12 Claims, 2 Drawing Sheets

(52) U.S. Cl.
　　　CPC .................. *D07B 2201/104* (2013.01); *D07B 2201/2006* (2013.01); *D07B 2201/2009* (2013.01); *D07B 2201/2066* (2013.01); *D07B 2205/3025* (2013.01); *D07B 2401/2095* (2013.01); *D07B 2501/2046* (2013.01)

(56) References Cited

FOREIGN PATENT DOCUMENTS

| | | | | | |
|---|---|---|---|---|---|
| CN | 112359623 A | * | 2/2021 | ............... | D07B 1/06 |
| WO | WO-2011144469 A1 | * | 11/2011 | ............. | B60C 9/005 |

* cited by examiner

STEEL CORD AND MANUFACTURING PROCESS THEREFOR

FIELD

The present invention relates to the field of steel cords for radial tires, and particularly relates to a steel cord and a manufacturing process therefor.

BACKGROUND

The key step of improving the performance of a radial tire during the manufacturing process of the tire is that a steel cord and rubber are in a tire forming process. An ideal state of the process is that the rubber can be penetrated into the inside of the steel cord to completely cover each steel wire in the steel cord. If the inside of the steel cord is retained in a hollow state, moisture and the like immersed from a cracked position of the surface of the tire into the inside of the steel cord would be immersed into the gaps inside the hollow steel cord, so that the inside of the steel cord is corroded, resulting in deterioration of the fatigue performance of the steel cord and shortening of the service life of the tire. Therefore, the rubber penetration performance of the steel cord has become an important indicator of the structural design of the steel cord.

At present, a steel cord used in a radial tire has a 4×1 structural form, but cannot allow for effective rubber penetration, for example, the F position of FIG. 5a is an internal cavity caused by failure of rubber penetration.

SUMMARY

To solve the foregoing problem, the present invention provides a steel cord capable of improving rubber penetration capability and stable in structure, and a manufacturing process therefor.

To achieve the foregoing technical purposes and the foregoing technical effects, the present invention is implemented by the following technical solutions:

a steel cord, including:
a steel core wire located in the center and having a diameter of d;
M sheath-layer steel wires arranged around the steel core wire in the center, tangent to the steel core wire, and having a diameter of d1, at least two gaps L existing between the M sheath-layer steel wires, where M is 4;
d, d1, and L satisfy the following relationship:

$0.420 < (d/d1) < 0.800;$ d1 is between 0.20 mm and 0.44 mm; and
L≥0.0008 mm.
Preferably, d, d1, and L satisfy the following relationship:

$0.462 < (d/d1) < 0.640;$ and

L≥0.006 mm.
Further, the first preferred solution of the present invention is that d1 is between 0.20 mm and 0.30 mm, and $0.521 < (d/d1) < 0.640$.
Further, correspondingly, L≥0.015 mm.
Further, the second preferred solution of the present invention is that d1 is between 0.30 mm and 0.44 mm, and $0.462 < (d/d1) < 0.640$.
Further, correspondingly, L≥0.010 mm.
As a further improvement of the present invention, the lay length of the M sheath-layer steel wires is 5-25 mm, and the lay direction is S or Z direction.

The present invention further provides a manufacturing method for the steel cord having the foregoing structure, where in the twisting process, the steel core wire and the M sheath-layer steel wires are simultaneously unwound, the unwinding tension of the sheath-layer steel wires being equal, and the unwinding tension of the steel core wire being greater than that of each sheath-layer steel wire; and the steel core wire is placed in the center position, and the M sheath-layer steel wires are uniformly distributed at 360° and bundled together around the steel core wire for twisting.

The beneficial effects achieved by the present invention are that: in the present invention, by adjusting the diameters of the central steel core wire and the outer sheath-layer steel wires and a diameter ratio thereof, a steel cord having a stable 1+4 structure can be obtained, and gaps for rubber penetration can also be formed between adjacent sheath-layer steel wires; and by adjusting the diameter of the outer sheath-layer steel wires, rubber can be sufficiently penetrated into the gaps, thereby reducing air content in the steel cord. Therefore, on one hand, point contact friction between the layers of steel wires are prevented due to the lack of penetration of sufficient rubber, and the problem of failure of the bearing capacity of the steel cord due to abrasion is further solved; on the other hand, moisture and the like immersed from a cracked position of the surface of a tire into the inside of the steel cord are prevented from being immersed into the gaps inside the hollow steel cord, thereby improving corrosion resistance, fatigue resistance and impact resistance of the tire, and prolonging the service life of the tire.

BRIEF DESCRIPTION OF THE DRAWINGS

FIG. 5 is an effect schematic diagram of the dimension of a gap L affecting penetration of a rubber fluid, in which FIG. 5(a) is a steel cord having a 4×1 structure in the prior art, FIG. 5(b) is an effect schematic diagram of rubber fluid penetration of a steel cord having a 1+4 structure of the present invention, and FIG. 5(c) is an enlarged schematic diagram of the E position of FIG. 5(b).

10: steel core wire; 20: sheath-layer steel wire; 30: steel cord.

DETAILED DESCRIPTION

In order to make the objectives, technical solutions and advantages of the present invention clearer, the present invention will be further described in detail below with reference to embodiments. It should be understood that the specific embodiments escribed herein are merely used to explain the present invention, and are not intended to limit the present invention.

The application principle of the present invention will be described in detail below with reference to the accompanying drawings.

Figure 1:
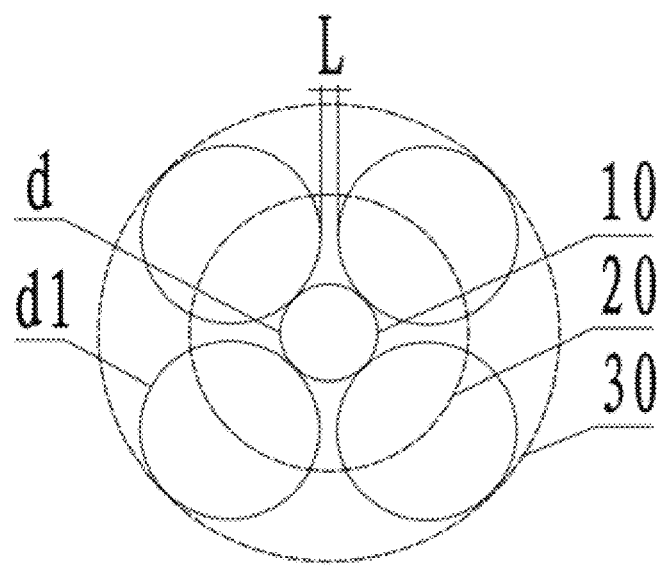
FIG. 1 is a schematic structural diagram of a steel cord having a 1+4 structure according to the present invention.
Figure 2:
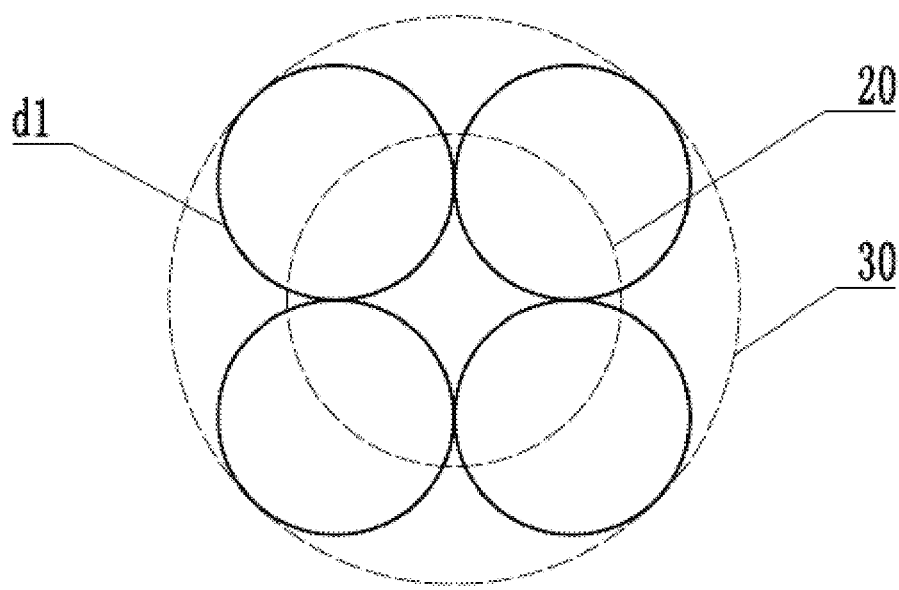
FIG. 2 is a schematic structural diagram of an existing product structure (without a steel core wire), which is referred to as a steel cord having a 4×1 structure.

According to the structure of a steel cord manufactured by the present invention shown in FIG. 1, the steel cord 30 includes a steel core wire 10 located in the center, and M sheath-layer steel wires 20 arranged around the steel core wire 10 in the center and tangent to the outer peripheral surface of the steel core wire 10. There are at least two gaps L between the M sheath-layer steel wires. The diameter d of the steel core wire 10 is less than the diameter d1 of the sheath-layer steel wires 20.

Specifically, the steel cord 30 used by a radial tire meets the requirement of the tire cord strength, and also further improves the performance of the tire and facilitates prolonging of the service life of the tire.

The width dimension of the gaps L is adjusted by adjusting the ratio of d to d1. In the present invention, the ratio of d to d1 is 0.420-0.640, so as to avoid aggregation of the gaps L caused by sliding of the outer sheath-layer steel wires 20, which causes the total dimension of the aggregated gaps L to be greater than the dimension of the steel core wire 10, and may cause the central steel core wire 10 to slide to the outer layer to form a tight structure.

On this basis, in order to enable rubber to be fully penetrated into the gaps L, the dimension of the gaps L is controlled by adjusting the diameter d1 of the sheath-layer steel wires. The diameter d1 of the sheath-layer steel wires is between 0.20 mm and 0.44 mm, and the average width of the obtained gaps L is not less than 0.0008 mm.

More preferably, the ratio of d to d1 is 0.462-0.640, so that the average width of the obtained gaps L is not less than 0.006 mm.

Specifically, adjustment may be made in the following two situations.

When the diameter d1 of the sheath-layer steel wires is between 0.20 mm and 0.30 mm, the dimension of the gaps L needs to be increased to improve the success rate of the rubber penetration. Therefore, $0.521 < (d/d1) < 0.640$. L is controlled to be at least 0.015 mm.

When the diameter d1 of the sheath-layer steel wires is between 0.30 mm and 0.44 mm, the dimension of the gaps L may be appropriately reduced to ensure complete penetration of the rubber. Therefore, $0.462 < (d/d1) < 0.640$. The dimension of the gaps L is only required to be controlled at 0.010 mm or above.

The steel cord 30 of the structure has the following advantages.

(1) A double-layer 1+M structure is used, and the middle steel core wire 10 has a diameter less than that of the sheath-layer steel wires 20, so that the central single steel wire is prevented from serving as a main part for bearing mechanical impact, and the possibility of breakage of the steel cord 30 is reduced.

Figure 4:
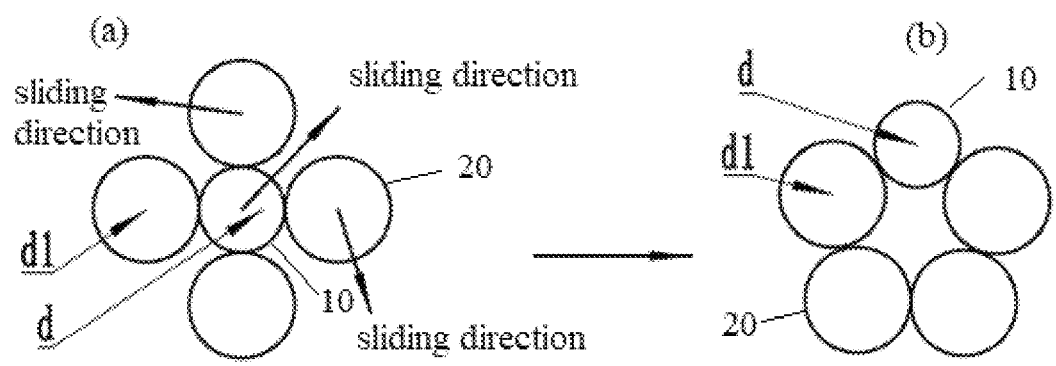
FIG. 4 is a schematic structural diagram of sliding of a 1+4 steel cord in the prior art.

(2) The ratio of d to d1 is adjusted. Therefore, on one hand, a quadrilateral cross-section having a stable structure can be obtained, as shown in FIG. 4a, thereby avoiding the displacement of the sheath-layer steel wires 20, which causes the central steel core wire 10 to be exposed to the outer layer to form a pentagon with poor rubber penetration and irregular structure, as shown in FIG. 4b; on the other hand, two connected sheath-layer steel wires 20 are not in contact with each other, so that the gap L reserved between the two sheath-layer steel wires 20 facilitates rubber penetration.

Figure 5:
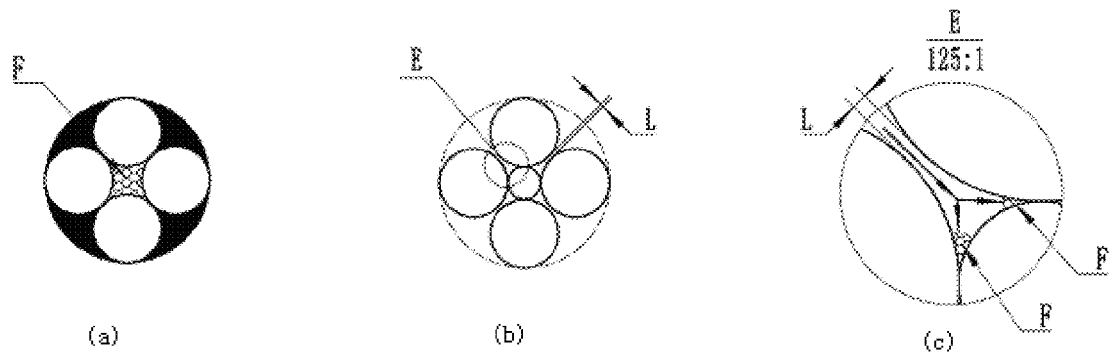

(3) By means of the adjustment, while the structure of the steel cord 30 is ensured to be stable, the width of the gaps L can also be adjusted. Since the width position at the gaps L is the narrowest position for a rubber body wrapped in the steel cord 30, it is not just the position of a penetration port of the rubber, but also a position similar to a bottleneck, as shown in the E position of FIG. 5b. Due to large viscosity and poor fluidity of the rubber fluid, the rubber fluid is easily blocked at the bottleneck in the process of the rubber penetration process, so that an internal cavity between the bottleneck and the middle steel core wire 10 is formed, as shown in the F position of FIG. 5c. Therefore, the structure of the tire cord layer of the tire is not uniform, and the occurrence of steel wire corrosion caused by penetration of moisture in the later period is also avoided. Moreover, the diameters of the steel core wire 10 and the sheath-layer steel wires 20 also affect penetration of the rubber fluid, in particular, the diameter of the sheath-layer steel wires 20. When the rubber fluid is penetrated into the steel cord 30, an ideal flow condition of the fluid is that, firstly, the rubber fluid flows inwardly to the surface of the steel core wire 10 along the surfaces of the sheath-layer steel wires 20, which is followed by opposite filling from the bottom. Since the surface curvatures of the steel core wire 10 and the sheath-layer steel wires 20 are different, the fluid ductility on the respective surfaces is also different. In the present invention, the diameter of the sheath-layer steel wires 20 is greater than the diameter of the steel core wire 10, so that the rubber fluid may flow to positions of vertex angles where the steel core wire 10 makes contact with the sheath-layer steel wires 20, and the gaps of the vertex angles are completely filled. Moreover, the ratio of d to d1 is adjusted according to the diameter of the sheath-layer steel wires 20, so as to adjust the dimension of the gaps L at the bottleneck positions, so that a steel cord having a more stable structure is obtained while effective penetration of the rubber fluid is satisfied.

The steel cord 30 having a 1+4 structure is constructed. The steel cord 30 is manufactured according to the following process.

The process flow is:

raw material→coarse drawing→central wire thermal treatment→medium drawing→thermal treatment electroplating→wet drawing→twisting→finished product.

The raw material is:

a steel wire rod including the following components: a minimum carbon content of 0.60% (e.g., at least 0.72% or at least 0.80% or at least 0.86% or at least 0.92%); a manganese content ranging from 0.20% to 0.90%; a silicon content ranging from 0.15% to 0.90%; a maximum sulfur content of 0.03%; and a maximum phosphorus content of 0.30%. In order to reduce the amount of deformation required for a predetermined tensile strength, elements such as chromium (up to 0.1 to 0.4%) and boron can also be added. The remaining component is iron, and all percentages are weight percentages.

The steel wire rod is drawn to a steel wire having a required final diameter through the steps of coarse drawing, medium pulling, wet drawing and the like. The final diameter of the steel wire ranges from 0.10 mm to 0.44 mm. There may be one or two thermal treatment steps between the drawing steps such as coarse pulling, medium pulling, and wet drawing, for example, patenting treatment of the steel wire.

The steel wire is subjected to electroplating treatment before wet drawing, so that the steel wire has a coating layer for improving the rubber adhesion force. The coating layer is, for example, a composite body with different copper-zinc percentages, and the percentage is weight percentage.

Figure 3:
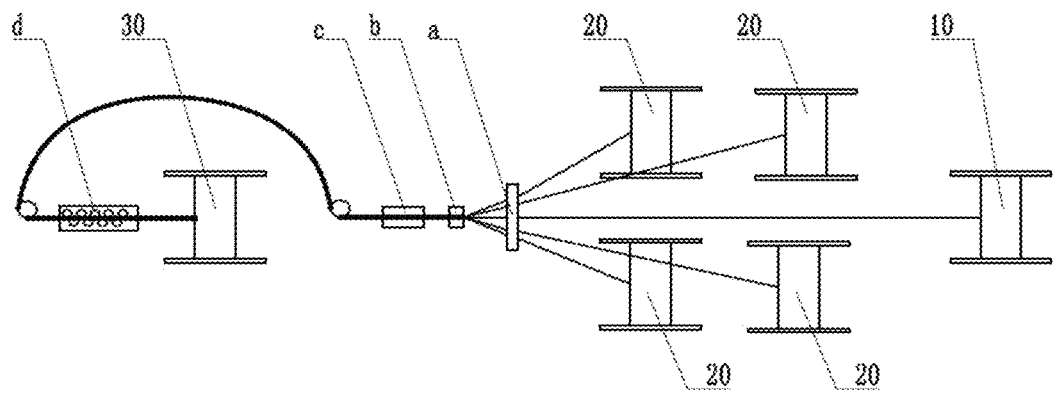
FIG. 3 is a schematic diagram of a manufacturing process for a steel cord according to the present invention.

The twisting can be performed by a tubular twisting machine or a double-twisting machine, preferably a double-twisting machine, as shown in FIG. 3. The steel core wire 10 and the M sheath-layer steel wires 20 are simultaneously unwound, the unwinding tension of all the M sheath-layer steel wires 20 is equal, and the unwinding tension of the steel core wire 10 is greater than the average value of the unwinding tension of the M sheath-layer steel wires 20. When all the steel wires pass through a wire dividing device a, the steel core wire 10 is located in the central position of a wire dividing disc, and the M sheath-layer steel wires 20 are uniformly distributed at 360° around the steel core wire 10, and together pass through a bundling position b and a steel cord structure stabilizing device c and then are twisted in an S direction, with a lay length of 20 mm (d1 of the sheath-layer steel wires is 0.415 mm) or a lay length of 16 mm (d1 of the sheath-layer steel wires is 0.280 mm). The steel wire bundle passes through a stress relief device d and finally becomes the steel cord 30.

Description of Results

Taking a 1+4 structure as an example

Embodiments 1-5 and 7-11: the steel cord 30 is manufactured by adjusting the structure of the steel cord 30 according to a parameter relationship corresponding to the various embodiments shown in Table 1.

TABLE 1

| | Steel core wire d (mm) | Sheath-layer steel wire d1 (mm) | d/d1 | Gap L (mm) | Rubber penetration test (pressure drop) % | Rubber penetration test (coating) % |
|---|---|---|---|---|---|---|
| Control group 1 | 0 | 0.415 | 0 | 0 | 64 | 0 |
| Embodiment 1 | 0.200 | 0.415 | 0.482 | 0.0199 | 0 | 61 |
| Embodiment 2 | 0.210 | 0.415 | 0.506 | 0.0269 | 0 | 75 |
| Embodiment 3 | 0.220 | 0.415 | 0.530 | 0.0340 | 0 | 78 |
| Embodiment 4 | 0.260 | 0.415 | 0.627 | 0.0624 | 0 | 94 |
| Embodiment 5 | 0.300 | 0.415 | 0.723 | 0.0906 | 7 | 88 |
| Control group 2 | 0 | 0.280 | 0 | 0 | 43 | 0 |
| Embodiment 7 | 0,130 | 0.280 | 0.464 | 0.0099 | 16 | 38 |
| Embodiment 8 | 0.140 | 0.280 | 0.500 | 0.0170 | 15 | 46 |
| Embodiment 9 | 0.150 | 0.280 | 0.536 | 0.0241 | 3 | 78 |
| Embodiment 10 | 0.170 | 0.280 | 0.607 | 0.0382 | 0 | 88 |
| Embodiment 11 | 0.190 | 0.280 | 0.679 | 0.0524 | 10 | 69 |

In Table 1, the lower the pressure drop of the rubber penetration test, the better the rubber penetration performance; 0% of pressure drop indicates complete rubber penetration. For a specific rubber penetration pressure drop method, please refer to Chinese Patent Application with a publication No. being CN 102666972A.

In Table 1, the larger the coating of the rubber penetration test, the better the rubber penetration performance; 100% of coating indicates complete rubber penetration. The specific coating method for the rubber penetration test is: intercepting a section of steel cord and placing same in a mold box in which rubber has been placed; then, also coating rubber on the other side of the placed steel cord; under a high temperature and a high pressure for a certain time, forming a steel cord sample cured in the rubber; intercepting a 25 mm sample, stripping the sheath-layer steel wire, and measuring the approximate length J and the width K of the uncoated part of the sheath-layer steel wire M; calculating the area of the uncoated steel wire, and causing the area to be divided by the total area of all steel wires obtained by multiplying the approximate width of the uncoated part by 25 mm, so as to obtain the percentage of the non-coated part; and obtaining a coating percentage by 1 minus this percentage. Please refer to formula 1 for details:

$$[1-(J_1*K_1+J_2*K_2+\ldots+J_M*K_M)/(K_1+K_2+\ldots+K_M)*25]\times100\%$$

Table 1 clearly shows that the rubber penetration performance of the steel cord is greatly improved compared with existing products. Rubber of the existing products substantially cannot be penetrated, so that steel wire corrosion easily occurs inside the steel cord. Moreover, the steel cord in the present invention has an open structure, and the rubber can well be penetrated into the steel cord, so that corrosion of the steel wires is well avoided, and the service life of the tire is prolonged. The ratio of the diameter of the steel core wire to the diameter of the sheath-layer steel wires determines the width of the gaps L, and also determines the difference of the rubber penetration performance.

The basic principles, major features and advantages of the present invention are displayed and described above. Persons skilled in the art should understand that the present invention is not limited by the foregoing embodiments. The foregoing embodiments and the description are merely illustrative of the principles of the present invention. Various changes and modifications can be made in the present invention without departing from the spirit and scope of the present invention, and these variations and improvements fall within the scope of protection of the present invention. The scope of protection of the present invention is defined by the appended claims and equivalents thereof.

What is claimed is:

1. A manufacturing method for a steel cord, wherein, the steel cord comprises:
   a steel core wire located in a center and having a diameter of d;
   M sheath-layer steel wires arranged around the steel core wire in the center, tangent to the steel core wire, and having a diameter of d1, at least two gaps L existing between the M sheath-layer steel wires, wherein M is 4;
   d, d1, and L satisfy a relationship:

$$0.420<(d/d1)<0.800;$$

d1 is between 0.20 mm and 0.44 mm; and
   $L \geq 0.0008$ mm;
   wherein,
   in a twisting process, a steel core wire and M sheath-layer steel wires are simultaneously unwound, an unwinding tension of the sheath-layer steel wires being equal, and the unwinding tension of the steel core wire being greater than that of each sheath-layer steel wire; and the steel core wire is placed in the center, and the M sheath-layer steel wires are uniformly distributed at 360° and bundled together around the steel core wire for twisting.

2. The manufacturing method according to claim 1, wherein,
   d, d1, and L satisfy a relationship:

$$0.462<(d/d1)<0.640; \text{ and}$$

$L \geq 0.006$ mm.

3. The manufacturing method according to claim 2, wherein,
   d1 is between 0.20 mm and 0.30 mm; and $0.521<(d/d1)<0.640$.

4. The manufacturing method according to claim 3, wherein,

L≥0.015 mm.

5. The manufacturing method according to claim 2, wherein, d1 is between 0.30 mm and 0.44 mm; and 0.462<(d/d1)<0.640.

6. The manufacturing method according to claim 5, wherein,

L≥0.010 mm.

7. The manufacturing method according to claim 1, wherein, a lay length of the M sheath-layer steel wires is 5-25 mm, and a lay direction is S or Z direction.

8. The steel cord according to claim 2, wherein, a lay length of the M sheath-layer steel wires is 5-25 mm, and a lay direction is S or Z direction.

9. The steel cord according to claim 3, wherein, a lay length of the M sheath-layer steel wires is 5-25 mm, and a lay direction is S or Z direction.

10. The steel cord according to claim 4, wherein, a lay length of the M sheath-layer steel wires is 5-25 mm, and a lay direction is S or Z direction.

11. The steel cord according to claim 5, wherein, a lay length of the M sheath-layer steel wires is 5-25 mm, and a lay direction is S or Z direction.

12. The steel cord according to claim 6, wherein, a lay length of the M sheath-layer steel wires is 5-25 mm, and a lay direction is S or Z direction.

\* \* \* \* \*